US008453165B2

(12) United States Patent
McKinney (10) Patent No.: US 8,453,165 B2
(45) Date of Patent: May 28, 2013

(54) DISTRIBUTING EVENT PROCESSING IN EVENT RELATIONSHIP NETWORKS

(75) Inventor: Howard Milton McKinney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1528 days.

(21) Appl. No.: 12/017,683

(22) Filed: Jan. 22, 2008

(65) Prior Publication Data

US 2009/0187923 A1  Jul. 23, 2009

(51) Int. Cl.
G06F 3/00    (2006.01)
G06F 15/173  (2006.01)

(52) U.S. Cl.
USPC ............................ 719/318; 709/223; 709/224

(58) Field of Classification Search
None
See application file for complete search history.

(56) References Cited

U.S. PATENT DOCUMENTS

| | | | |
|---|---|---|---|
| 6,931,644 B2 | 8/2005 | Riosa et al. | |
| 7,003,779 B2 * | 2/2006 | Riosa et al. | 709/223 |
| 2003/0074440 A1 * | 4/2003 | Grabarnik et al. | 709/224 |
| 2005/0060721 A1 * | 3/2005 | Choudhary et al. | 719/318 |
| 2005/0091356 A1 * | 4/2005 | Izzo | 709/223 |
| 2005/0144624 A1 * | 6/2005 | Riosa et al. | 719/318 |
| 2005/0155021 A1 * | 7/2005 | DeWitt et al. | 717/130 |
| 2005/0172306 A1 * | 8/2005 | Agarwal et al. | 719/328 |
| 2006/0059568 A1 * | 3/2006 | Smith-Mickelson et al. | 726/27 |
| 2009/0165022 A1 * | 6/2009 | Madsen et al. | 719/318 |

OTHER PUBLICATIONS

Event-based Multimedia Chronicling Systems, Pilho Kim, 2005, pp. 1-12.*
Event Relationship Networks: A Framework for Action Oriented Analysis in Event Management, Thoenen, 2001, pp. 1-14.*
Event Summarization for System Management, Wei Peng, 2007, pp. 1-5.*
Data-driven Validation, Completion and Construction of Event Relationship Networks, Perng, 2003, pp. 1-6.*
Chang-Shing et al., Data-driven Validation, Completion and Construction of Event Relationship Networks, SIGKDD '03, Aug. 24-27, 2003, 729-734, ACM, Washington DC, USA.
Thoenen et al., Event Relationship Networks: A Framework for Action Oriented Analysis in Event Management, IBM Research Report, Sep. 28, 2000, 1, IBM Research Division.

* cited by examiner

*Primary Examiner* — Tuan Dao
(74) *Attorney, Agent, or Firm* — Garg Law Firm, PLLC; Rakesh Garg; Jeffrey S. LaBaw (57) ABSTRACT

A computer implemented method, system, and computer usable program code for distributing event processing are provided in the illustrative embodiments. An analysis is performed of the event information flowing from one event relationship network subnet to another event relationship network subnet in an event relationship network. Strength of a relationship between the first and the second event relationship network subnets is determined based on the analysis. A distribution of the event processing in the event relationship network is recommended based on the strength of the relationship.

17 Claims, 5 Drawing Sheets

DISTRIBUTING EVENT PROCESSING IN EVENT RELATIONSHIP NETWORKS

BACKGROUND OF THE INVENTION

1. Field of the Invention

The present invention relates generally to an improved data processing system, and in particular, to a computer implemented method for processing events. Still more particularly, the present invention relates to a computer implemented method, system, and computer usable program code for distributing event processing in event relationship networks.

2. Description of the Related Art

Several data processing systems may communicate with each other in a network of data processing systems. As a part of this communication, a data processing system may send messages that inform other data processing systems about conditions existing on the sender data processing system. Network designers call these messages "events."

By receiving an event, a data processing system may become aware of a condition that may exist in the data processing system or the vicinity of the data processing system, such as in a data network. The condition or state may be a condition or state of a hardware component, a software component, data, or a combination thereof. For example, a data storage system may have a condition where the free data storage capacity is below a preset threshold. The data storage system may inform other data processing systems about this condition by sending an event.

An event may relate to other events that may be present in a given data processing system or in the data processing system's vicinity. For example, an event may indicate to a data processing system that a login attempt has failed. Another event, by being related to the first event, may inform the data processing system that a second login attempt has also failed.

A data processing system may listen for events and process the events according to rules. Data processing systems may perform certain actions based on the events or the relationship of the events they recognize. For example, a rule may be that the data processing system locks a user account after three consecutive failed logins within a five-minute period. The rule may further direct the data processing system to send an email notice to a system administrator.

Events are processed on data processing systems by rules engines that execute a set of rules. A set of rules is one or more rules. The data processing systems send and receive events that are then processed by rules engines. Several rules engines may be operating on several data processing systems running on several data processing systems in a network of data processing systems. Communication among the data processing systems, and consequently among the rules engines operating thereon, can produce a volume of event related data traffic in that data network.

Data processing systems may exchange many types of events amongst themselves over a network. A data processing system may also lookup event data in other data processing systems for information relating to an event. Event data is data relating to an event, such as the data describing the event, the data referenced by the event, and the data usable for processing the event.

SUMMARY OF THE INVENTION

The illustrative embodiments provide a computer implemented method, system, and computer usable program code for distributing event processing. An analysis is performed of the event information flowing from one event relationship network subnet to another event relationship network subnet in an event relationship network. Strength of a relationship between the first and the second event relationship network subnets is determined based on the analysis. A distribution of the event processing in the event relationship network is recommended based on the strength of the relationship.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Illustrative embodiments recognize that in a data processing environment, events may be causally related to each other. A causal relationship is a relationship between events when the occurrence of one event causes another event to occur. For example, a network-link-down event may occur when a router becomes unavailable in a network. A redundant router in the network may have been configured to replace the unavailable router. The network-link-down event may cause the redundant router to send a redundant-network-link-available event. Thus, network-link-down event may cause the redundant-network-link-available event, and the two events may be causally related to one another. As another example, an event, such as database-space-low event from a database, may cause an alert event to be sent to a database administrator.

An event in combination with another event may trigger a variety of actions. For example, the database-space-low event followed by a database-down event from the database may trigger an automatic database recovery action, which may or may not include a notifying event being sent to the database administrator.

An event in one system may cause the system to perform an event cache lookup in another data processing system across a network. An event cache is a record of other events, such as events that may have occurred prior to or concurrently with the present event in question. In certain implementations, event cache lookup may itself constitute an event. The event and the event cache lookup therefore have a causal relationship. Many other events may be causally related to one another. Furthermore, an event may be causally related to any number of other events by causing any of the causally related events either directly or with one or more events intervening.

In a data processing environment, generating, passing, handling, and processing events can use substantial data processing resources. Network designers plan the processing of the events in a data processing environment by designing an event relationship network (ERN). An event relationship network is a representation of the relationships of the events in the data processing environment.

An event relationship network can be partitioned into two or more event relationship network subnets. A part of an event relationship network, an event relationship network subnet, may process some events. Another event relationship network subnet may process certain other events. When an event relationship network is implemented in an actual data processing environment, rules engines operating on one or more data processing systems process the events from each event relationship network subnet.

Events processed in one event relationship network subnet may cause events to occur in another event relationship network subnet. Thus, event relationship network subnets can themselves be related to each other, together forming an event relationship network. In the implementation, the causal relationships between events across event relationship network subnets cause the rules engines to communicate with each other over the data network of the data processing environment.

Presently, network designers use event relationship network design tools for designing event relationship networks and event relationship network subnets. These tools provide the designers a graphical representation of the events and the causal relationships of those events in the event relationship network. Event correlation is the process of analyzing event data and the relationship of events with one another, such as for identifying patterns, common causes, and root causes of the events.

Network designers use the graphical representation of the events and event correlations to design correlation rules. A correlation rule is a rule that governs a particular event correlation and determines an action. A rules engine executes the correlation rule and performs the action when the rules engine encounters the events that are correlated in the rule.

A correlation rule can be implemented in a variety of computer executable code such that the rule can be executed by a rules engine on a variety of computer hardware configurations. For example, a correlation rule may be implemented in Java to execute in a Java™ virtual machine (JVM) independent of a type of operating system. Java™ and all Java™-based trademarks are trademarks of Sun Microsystems, Inc. in the United States, other countries, or both. As another example, the correlation rule may be implemented in executable code, such as by compiling C++ code, so that the executable code can execute under a particular operating system.

Illustrative embodiments recognize that where events in one event relationship network subnet have causal relationships to events in another event relationship network subnet, data traffic may occur between those event relationship network subnets. For such relationships, significant amount of data of travel over a data network can occur as several rules engines send and receive event data and execute correlation rules. Illustrative embodiments further recognize that data traffic may also occur when an event management system a rules engine that is processing events for one event relationship network subnet performs a lookup in another part of the data processing environment that may include another event relationship network subnet.

Illustrative embodiments recognize that reducing the traffic of event data over a network may be advantageous. Some exemplary advantages from reducing the data traffic may be increased data network efficiency as less data is transported over the network, and faster response times to the events as rules engines may access remotely located event data less frequently. The advantages listed above are only exemplary and are not intended to be limiting on the illustrative embodiments. Additional advantages may be realized by specific illustrative embodiments. Furthermore, a particular illustrative embodiment may have some, all, or none of the advantages enumerated above.

Illustrative embodiments described here provide a method, system, and computer usable program product for reducing the event data traffic. Using the illustrative embodiments, the network designers can analyze and assign a measure of strength to a relationship between two or more event relationship network subnets. Using the strengths of the various relationships between event relationship network subnets according to the illustrative embodiments, the network designers can distribute the processing of events from specific event relationship network subnets to specific rules engines. Using the illustrative embodiments, the network designers can create a more efficient distribution of event relationship network subnets as compared to the event relationship network designs made using present event relationship network design methodology.

Figure 1:
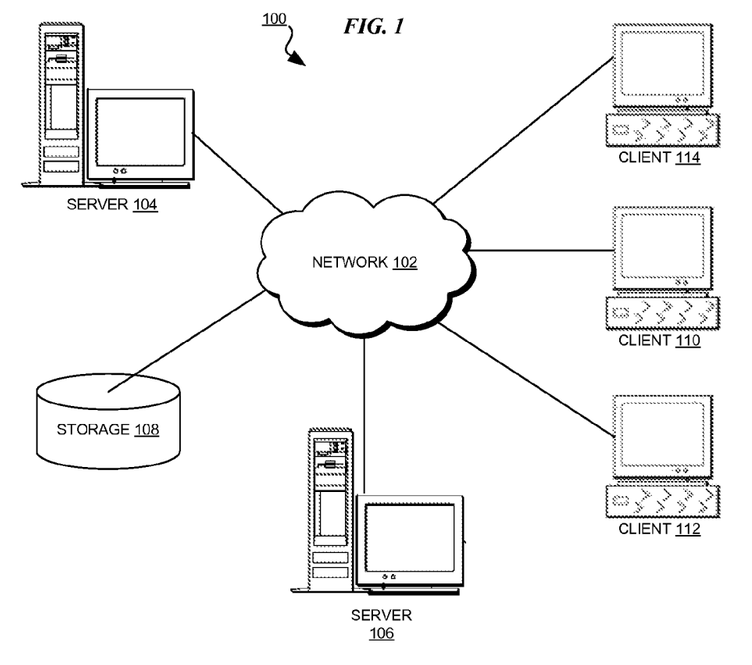
FIG. 1 depicts a pictorial representation of a network of data processing systems in which illustrative embodiments may be implemented.
Figure 2:
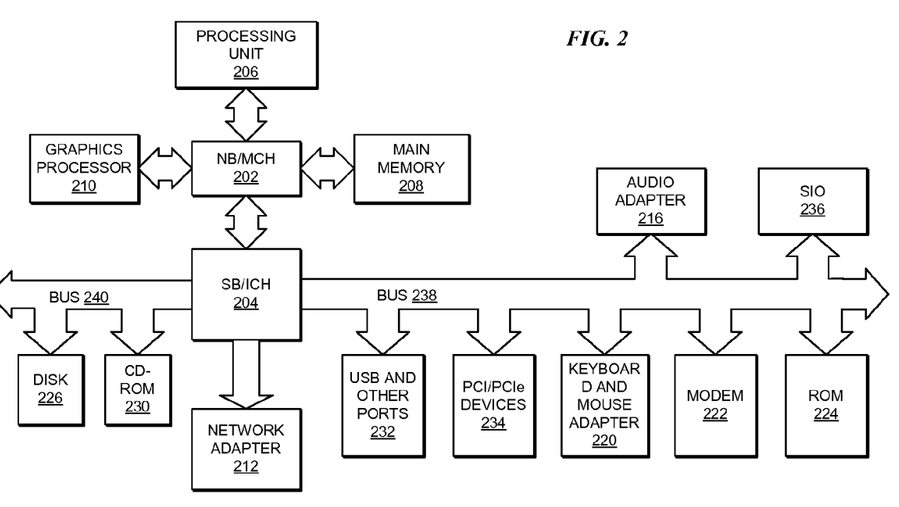
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

In the depicted example, server 104 and server 106 couple to network 102 along with storage unit 108. In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment. A client server environment enables software applications and data to be distributed across a network such that an application functions by using the interactivity between a client data processing system and a server data processing system.

The interactivity between the clients and the servers in a client server environment may include data communications pertaining to events. Data processing systems in data processing environment 100 may detect conditions in data processing environment 100 and communicate events to each other. For example, storage 108 may detect a condition that the space available for storing additional data is below a preset threshold. Storage 108 may send an event to server 104 over network 102. Network 102 may include one or more data networks that may communicate with each other using a variety of protocols. Server 104 may communicate the event to server 106 and clients 110 and 112. Of course, the event and the communication described above are only exemplary and not intended to be limiting on the illustrative embodiments. Many other events and communications may be similarly implemented without departing from the scope of the illustrative embodiments.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
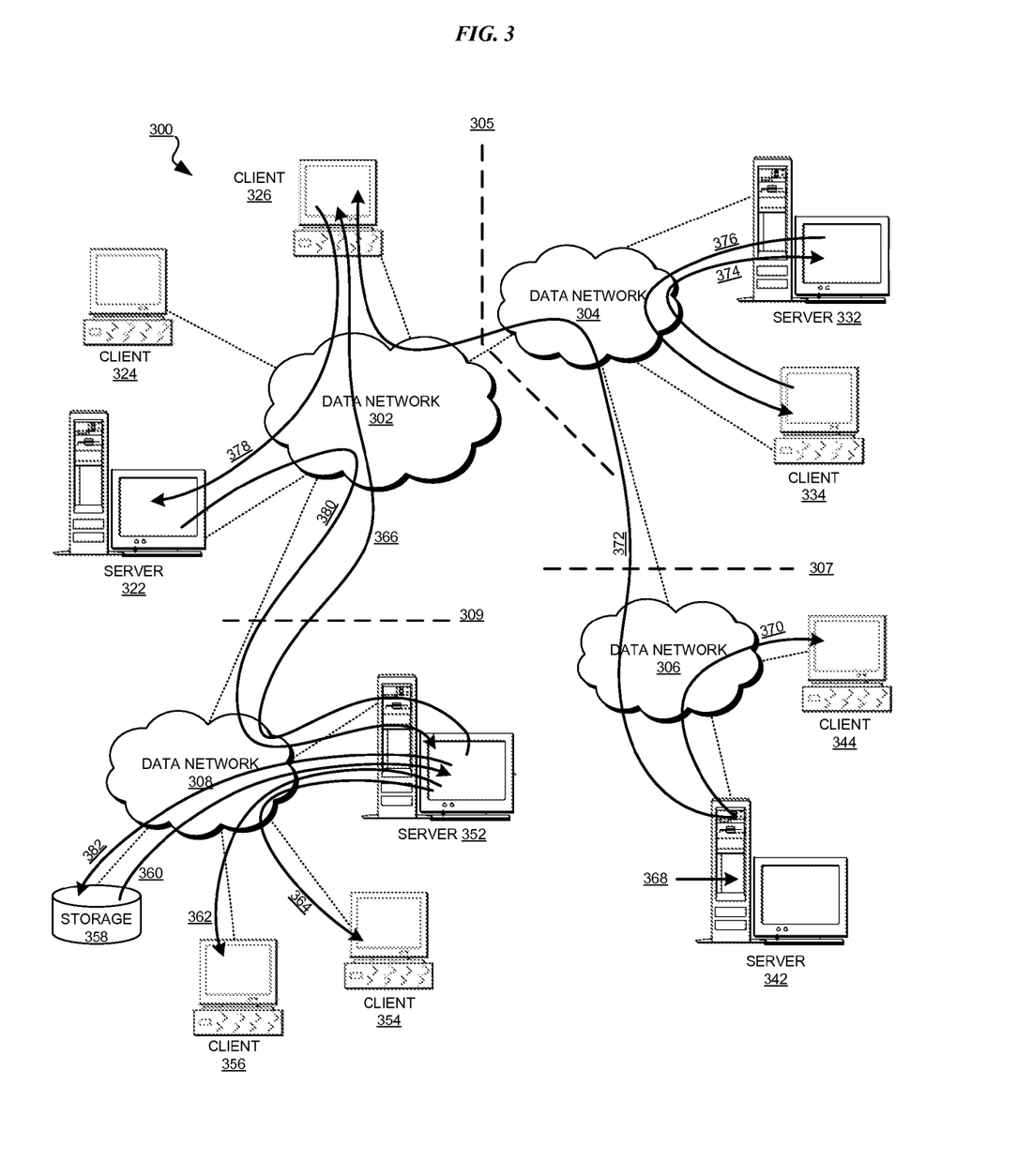
FIG. 3 depicts a block diagram of an exemplary communication of events in a data processing environment in accordance with an illustrative embodiment.

With reference to FIG. 3, this figure depicts a block diagram of an exemplary communication of events in a data processing environment in accordance with an illustrative embodiment. Data processing environment 300 may be similar to data processing environment 100 in FIG. 1. Data networks 302, 304, 306, and 308 may each be similar to network 102 in FIG. 1.

Data network 302 facilitates data communication between server 322, and clients 324 and 326. Data network 302 also communicates with data network 304. Data network 302 may be separate from but interconnected with data network 304 across logical boundary 305. A logical boundary is a hypothetical demarcation identifying the limits of a network. Data network 304 facilitates data communication between server 332 and client 334. Data network 304 also communicates with data network 306. Data network 304 may be separate from but interconnected with data network 306 across logical boundary 307. Data network 306 facilitates data communication between server 342 and client 344. Data network 302 also communicates with data network 308. Data network 302 may be separate from but interconnected with data network 308 across logical boundary 309. Data network 308 facilitates data communication between server 352, clients 354 and 356, and storage 358.

Servers 322, 332, 342, and 352 may each be implemented using any of servers 104 and 106 in FIG. 1. Clients 324, 326, 334, 344, 354, and 356 may each be implemented using any of clients 110-114 in FIG. 1. Storage 358 may be implemented using storage 108 in FIG. 1.

The following example illustrates the causal relationships between several exemplary events in accordance with the illustrative embodiment. Consider that data processing environment 300 may be an exemplary depiction of a large data processing environment, such as in a company having several geographically offices, or a company having several data communication networks for supporting separate data processing needs. As an example, data network 302, server 322, and clients 324-326 may represent a company's network for supporting database activities. For example, server 322 may include or communicate with an Oracle™ database (not shown). Oracle™ is a registered trademark of Oracle Corporation in the United States and many other countries. Database administrators may use clients 324 and 326 to access the database through server 324.

Continuing with the example, data network 304, server 332, and client 334 may collectively represent the data processing environment of one of the departments, such as the accounting department, of the company. Similarly, data network 306, server 342, and client 344 may represent the data processing environment for receiving external information into the company, such as a news feed or customer access to company's data. Data network 308, server 352, clients 354-356, and storage 358 may represent the data processing environment of the company's enterprise system, such as an SAP® implementation. SAP® is a registered trademark of SAP AG in Germany and several other countries.

As an example, storage 358 may generate event 360 that reflects a database-space-low condition at storage 258. Server 352 may receive event 360 and send notification events 362, 364, and 366 to clients 354, 356, and 326 respectively. Events 362-366 are causally related to event 360. At another place in the company's data processing environment, server 342 may receive or generate event 368, such as by receiving a purchase order from a customer. Server 342 may send events 370 and 372, which may be causally related to event 368, to clients 344 and 326 respectively. Exemplarily, event 370 may be a logging event to log a received order, and event 372 may be a data-submitting event, submitting the data of the purchase order to a database application.

Continuing with the above example, a user in the accounting department may attempt to logon to server 332 using client 334. The user's attempt results in login-attempt event 374. Server 332 may send event 376 to client 334, which may be an access-granted or access-denied event. Event 376 is causally related to event 374.

Responsive to receiving event 372, client 326 may send event 378 and the data associated with the purchase order to server 322, such as for storing in the database. Event 378 is therefore causally related to event 372, and causally related to event 368. Server 322 may send event 380 to server 352 with the purchase order information, such as to add the order information to the enterprise system. Server 352 may send event 382 to storage 358 to store the purchase order information. Event 382 is causally related to event 380.

The above example illustrates several circumstances in which events may be generated and communicated in a data processing environment. The events described above are only exemplary and not intended to be limiting on the illustrative embodiments. Of course, particular implementations of the illustrative embodiments may use different or additional events and different or additional configuration of the data processing environment without departing from the scope of the illustrative embodiments.

Figure 4:
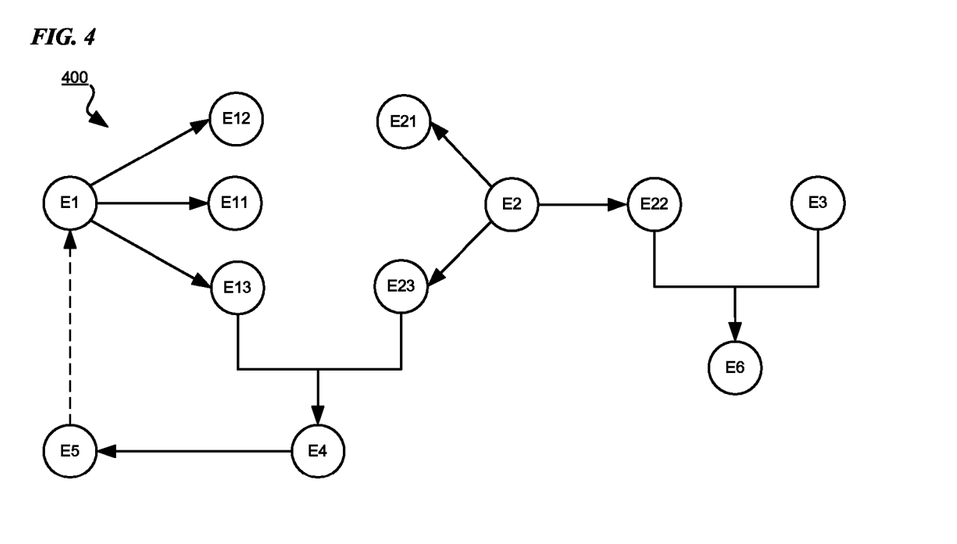
FIG. 4 depicts a state diagram of event relationships in accordance with an illustrative embodiment.

With reference to FIG. 4, this figure depicts a state diagram of event relationships in accordance with an illustrative embodiment. Event relationship diagram 400 may be implemented in data processing environment 300 in FIG. 3.

Event E1 is shown to cause events E11, E12, and E13 to occur. Events E11, E12, and E13 are causally related to event E1. Event E2 is shown to cause events E21, E22, and E23 to occur, such as in a part of the data processing environment that is different from the part where event E1 occurs. A rules engine executing correlation rules may detect that event E13 and event E23 have both occurred and generate event E4. A rules engine, same or different from the rules engine that generated event E4, may detect event E4 and generate E5. A rules engine may also detect event E22 together with event E3 and generate event E6.

In one embodiment, event E5 may be a clearing event for event E1. A clearing event is an event that indicates a return to a normal state and cancels a problem state. A normal state is a state or condition of a device or application that is intended to occur in the operation of that device or application. A problem state is a state or condition of the device or application that is unintended and occurs generally due to a fault or error.

Event relationship diagram 400 is a common method that network designers use for depicting event relationships. Correlation rules may implement these even relationships and cause a rules engine to perform certain actions. For example, in event relationship diagram 400, detecting events E13 and E23 results in event E4. Network designers use graphical tools to design this and other event relationships and actions into correlation rules. The correlation rules can then be implemented so that a rules engine may execute them in a specific data processing system configuration.

Figure 5:
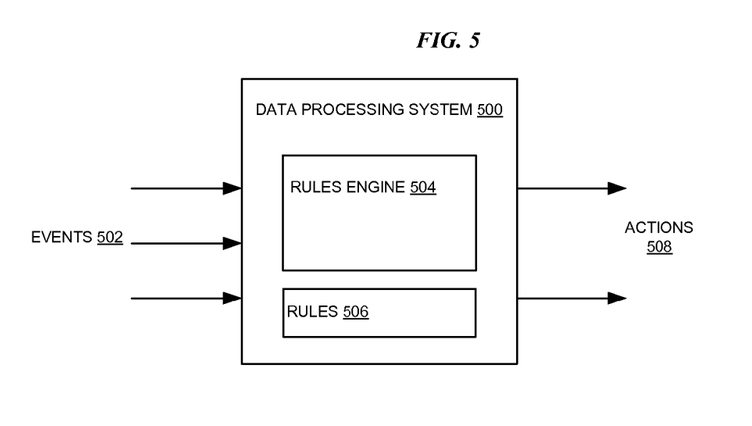
FIG. 5 depicts a block diagram of a rules engine in accordance with an illustrative embodiment.

With reference to FIG. 5, this figure depicts a block diagram of a rules engine in accordance with an illustrative embodiment. Data processing system 500 may be implemented using a server computer, such as server 352, or a client computer, such as client 326 in FIG. 3. Data processing system 500 receives events 502. Rules engine 504 operating in data processing system 500 correlates events 502 using rules 506. Rules 506 may include one or more correlation rules. Rules engine 504 determines actions 508 using rules 506.

In one embodiment, rules engine 504 may be implemented in a single data processing system. In another embodiment, rules engine 504 may be implemented using several data processing systems in a distributed computing environment. Rules 506 may be stored together with or separate from rules engine 504. For example, rules 506 may be stored in a database. Generally, a database for storing any type of information may be a relational database, an object oriented database, a flat file, an index file, or any other suitable data structure for storing information.

A number of rules engines may be available in a data processing environment. For implementing the event relationship network subnets in the data processing environment, network designers may associate specific event relationship network subnets with specific rules engines in accordance with the illustrative embodiments. Associating event relationship network subnets with rules engines in the manner described above is the process of distributing event relationship network subnets in accordance with the illustrative embodiment.

Figure 6:
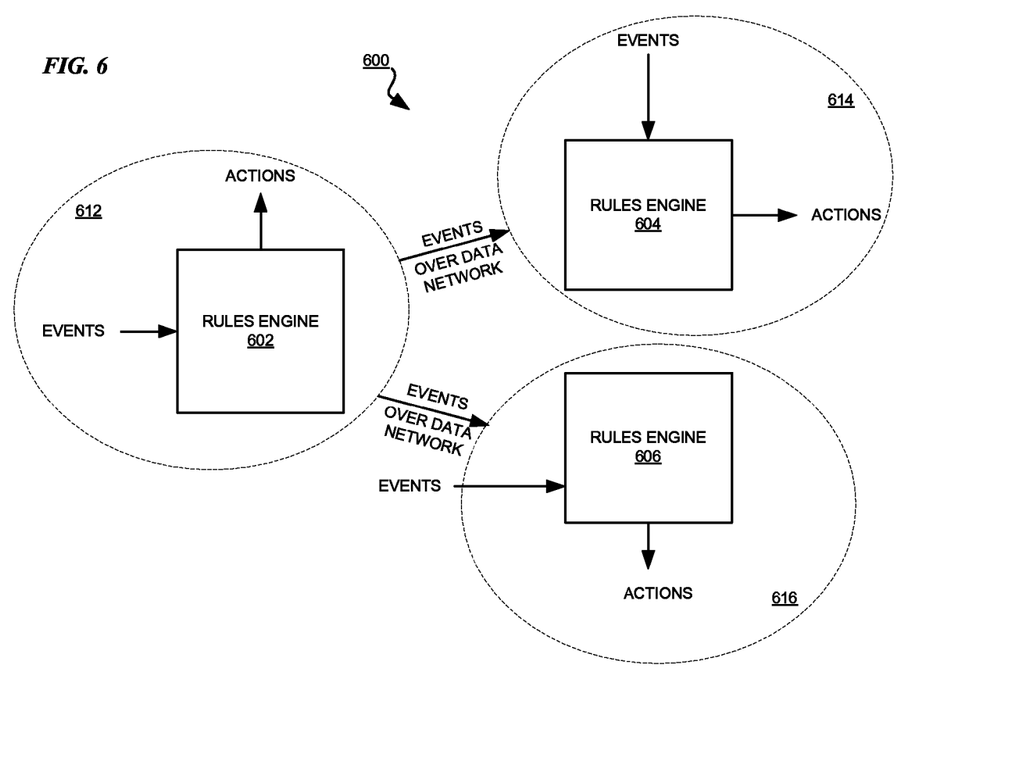
FIG. 6 depicts a block diagram of an implementation of an event relationship network in accordance with an illustrative embodiment.

With reference to FIG. 6, this figure depicts a block diagram of an implementation of an event relationship network in accordance with an illustrative embodiment. Event relationship network implementation 600 may employ a data processing environment, such as data processing environment 300 in FIG. 3.

Exemplary event relationship network implementation 600 depicts rules engines 602, 604, and 606. For simplicity, in one embodiment, each of rules engines 602-606 may process the events in a separate event relationship network subnet. Rules engine 602 is depicted to be processing the events in event relationship network subnet 612, rules engine 604 processing the events in event relationship network subnet 614, and rules engine 606 processing the events in event relationship network subnet 616.

Network designers design event relationship networks and event relationship network subnets with many considerations in mind. In another embodiment, an event relationship network design may use two or more rules engines to process events in one event relationship network subnet without departing from the scope of the illustrative embodiments. Conversely, another event relationship network design may have one rules engine process events from two or more event relationship network subnets without departing from the scope of the illustrative embodiments.

Figure 7:
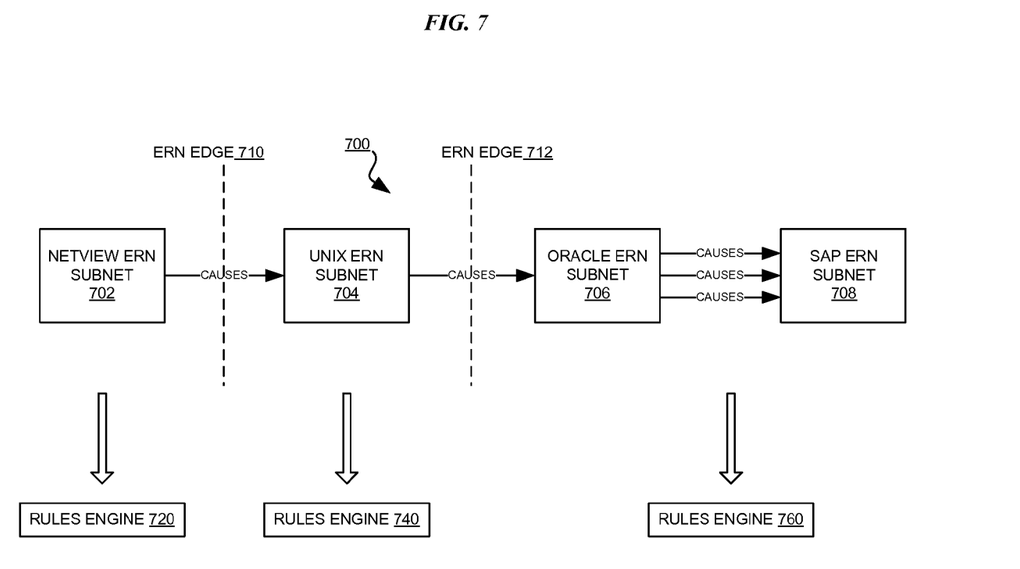
FIG. 7 depicts a block diagram of an event processing configuration in accordance with an illustrative embodiment.

With reference to FIG. 7, this figure depicts a block diagram of an event processing configuration in accordance with an illustrative embodiment. Configuration 700 may be implemented in data processing environment 300 in FIG. 3.

Configuration 700 depicts several exemplary event relationship network subnets operating in a variety of data processing environments, such as portions of data processing environment 300 divided by logical boundaries 305, 307, and 309 in FIG. 3. For example, Netview event relationship network subnet 702 may operate in a data processing environment, or a portion thereof, that uses IMB™ Tivoli™ Netview™ suite of network management applications and manages Netview events. IBM™, Tivoli™, and Netview™® are trademarks registered by International Business Machines Corporation in the United States and many other countries.

Similarly, UNIX event relationship network subnet 704 may operate in a UNIX data processing environment and manage UNIX related events. Oracle™ event relationship network subnet 706 may operate in a data processing environment that includes an Oracle™ database system and manages Oracle™ related events. SAP™ event relationship network subnet 708 may operate in a data processing environment that includes an SAP™ enterprise system and manages SAP™ related events.

Once network designers have created an event relationship network design and identified the event relationship network subnets such as shown in configuration 700, illustrative embodiments analyze the events that cross event relationship network edges. An event relationship network edge is an imaginary boundary, such as event relationship network edges 710, and 712, that events going from one event relationship network subnet to another event relationship network subnet cross.

In one embodiment, the analysis may include counting the number of events that are sent, dispatched, or forwarded from one event relationship network subnet to another across an event relationship network edge. For example, event relationship network subnets can have parent-child relationships with each other. A parent event relationship network subnet can have one or more child event relationship network subnets forwarding events to the parent event relationship network subnet.

In another embodiment, the analysis may include counting the number of event lookups, to wit, the number of lookups for event data, across an event relationship network edge. In another embodiment, the analysis may include a combination of number of events and event lookups crossing from one event relationship network subnet to another.

Based on the analysis, the illustrative embodiments determine the strength of the relationship between pairs of event relationship network subnets. In one embodiment, if higher than a threshold amount of event information crosses from one event relationship network subnet to another event relationship network subnet, the relationship between that pair of event relationship network subnets may be deemed strong. Conversely, if the event information crossing from one event relationship network subnet to another event relationship network subnet is smaller than or equal to the threshold value, the relationship between that pair of event relationship network subnets may be deemed weak. Event information includes event data, the number of events, the number of event lookups, or a combination thereof. Event information may also include a number of events in one event relationship network subnet that cause events in another event relationship network subnet.

In another embodiment, if a percentage of the number of events crossing between the event relationship network subnets is above a threshold percentage of the total number of events in flowing those event relationship network subnets then the relationship between that pair of event relationship network subnets may be deemed strong. If the percentage of the number of events crossing from one event relationship network subnet to another event relationship network subnet is smaller than or equal to the threshold percentage, the relationship between that pair of event relationship network subnets may be deemed weak. Of course, other criteria for analysis and strength determination may be used as may be suitable in particular implementations without departing from the scope of the illustrative embodiments. For example, an implementation may determine whether the number of events crossing from one event relationship network subnet to another is above or below a preset threshold to determine the strength of the relationship between the event relationship network subnets.

Once analyzed for the strength of the relationships, event relationship network subnets are tagged with a factor corresponding to the strength of their relationships with other event relationship network subnets. Tagging an event relationship network subnet is associating a factor, such as a number, with the event relationship network subnet. In this case, the tagging factor of an event relationship network subnet may be a number corresponding to the strength of that event relationship network subnet's relationship with an adjacent event relationship network subnet. An adjacent event relationship network subnet is another event relationship network subnet with which an event relationship network subnet has an exchange of event and event information. An event relationship network subnet may have several factors associated with the event relationship network subnet. Each factor may reflect the strength of the event relationship network subnet's relationship with a separate adjacent event relationship network subnet.

Based on the quantified strength of a relationship between pairs or sets of event relationship network subnets, the illustrative embodiment recommends a distribution of event relationship network subnets to the network designers, such as depicted in FIG. 7. For example, in FIG. 7, only one event crosses from Netview event relationship network subnet 702 to UNIX event relationship network subnet 704. If the threshold value above which a relationship between event relationship network subnets would be strong is set to 2, the relationship between Netview event relationship network subnet 702 and UNIX event relationship network subnet 704 is weak. Similarly, the relationship between UNIX event relationship network subnet 704 and Oracle event relationship network subnet 706 is also weak.

However, the relationship between Oracle event relationship network subnet 708 and SAP event relationship network subnet 708 is strong because three events cross from Oracle event relationship network subnet 706 to SAP event relationship network subnet 708. Based on this quantification, the illustrative embodiment may present to the network designer, such as via a graphical rule builder tool, a recommendation of which rules engine should process events from which event relationship network subnet. The recommended distribution of event processing minimizes the data traffic that would otherwise occur between event relationship network subnets.

In the depicted exemplary configuration 700 of FIG. 7, the illustrative embodiment may recommend that rules engine 720 process the events in Netview event relationship network subnet 702. In this example, the illustrative embodiment may further recommend that a separate rules engine, such as rules engine 740, process the events in UNIX event relationship network subnet 704. Separating the event correlation performed by rules engines 720 and 740 will not have a significant affect on the event related data traffic between the two event relationship network subnet as their relationship is weak anyway.

In contrast, the illustrative embodiment may recommend directing the processing of events from Oracle event relationship network subnet 706 and SAP event relationship network subnet 708 to a common rules engine, such as rules engine 760. According to this configuration, because all the events from each of those two event relationship network subnet will be processed and correlated in a common rules engine, the data traffic from communicating events and event-related information will likely reduce between the two event relationship network subnet as compared to when each event relationship network subnet has its own rule engine.

The depicted event processing configuration, the analysis, the quantification and tagging, and the recommendation described above are only exemplary. These depictions and descriptions are not intended to be limiting on the illustrative embodiments. Many other event processing configurations using the methodology of the illustrative embodiments will be conceivable from this disclosure. Furthermore, other analysis and quantification techniques can be employed in order to make the recommendation according to the illustrative embodiment, and the same are contemplated within the scope of the illustrative embodiments.

Figure 8:
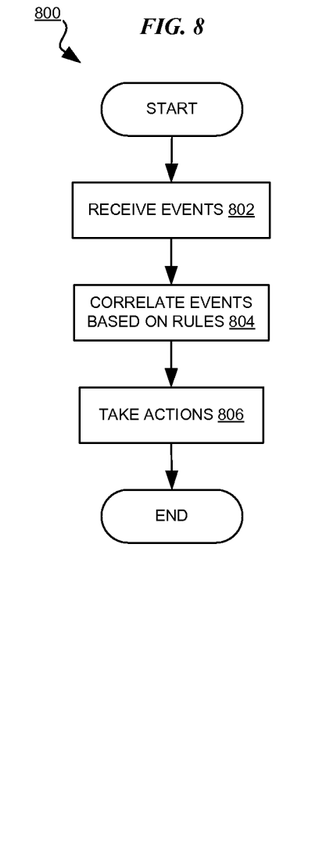
FIG. 8 depicts a flowchart of an event management process in accordance with an illustrative embodiment.

With reference to FIG. 8, this figure depicts a flowchart of an event management process in accordance with an illustrative embodiment. Process 800 may be implemented in a rules engine, such as rules engine 602 in FIG. 6.

Process 800 begins by receiving one or more events (step 802). The process then correlates the received events (step 804). The correlation in step 804 may be performed by using rules in a rules engine, such as rules 506 in FIG. 5.

The process then takes an action based on the correlated events (step 806). Taking an action, as in step 806, may include recommending an action, taking no action, taking more than one actions, and sending, forwarding, storing, dispatching, converting, or transmitting one or more events in the correlated events from step 804. The process ends thereafter.

Figure 9:
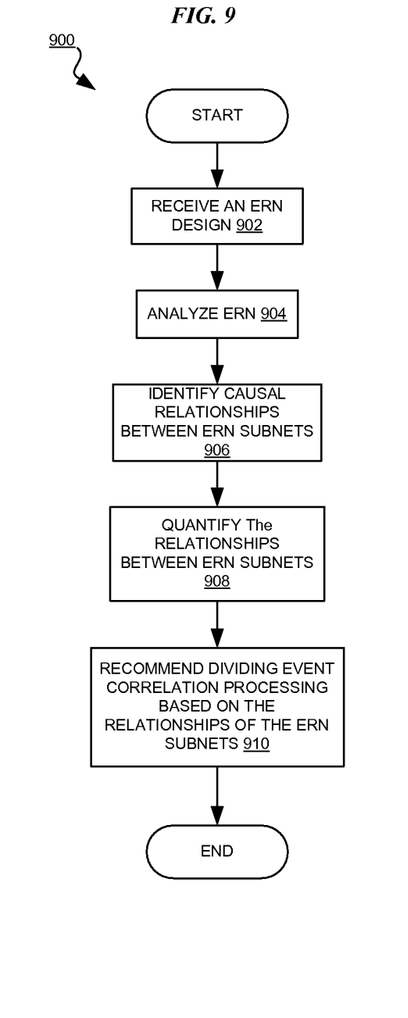
FIG. 9 depicts a flowchart of a process of distributing the event correlation processing systems in accordance with an illustrative embodiment.

With reference to FIG. 9, this figure depicts a flowchart of a process of distributing the event correlation processing systems in accordance with an illustrative embodiment. Process 900 may be implemented in a graphical tool used for event relationship network design.

Process 900 begins by receiving an event relationship network design (step 902). The process analyzes the event relationship network design by analyzing the flow of events, event information, or a combination thereof, between event relationship network subnets in the event relationship network design (step 904). The process may perform step 904 in the manner of the analysis described with respect to FIG. 7.

The process identifies relationships between event relationship network subnets including causal relationships between events in those event relationship network subnets (step 906). The process performs step 906 by identifying events, event information, or a combination thereof, that either cross from one event relationship network subnet to another, or cause events in another event relationship network subnet through causal relationships.

Based on the causal relationships identified in step 906, the process quantifies the relationships between event relationship network subnets (step 908). The process recommends distributing the event processing for those event relationship network subnets to different rules engines across the event relationship network based on the quantification of step 908 (step 910). The process ends thereafter.

The components in the block diagrams and the steps in the flowcharts described above are described only as exemplary. The components and the steps have been selected for the clarity of the description and are not limiting on the illustrative embodiments. For example, a particular implementation may combine, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for distributing event correlation processing in event relationship networks. By implementing the illustrative embodiments in conjunction with an event relationship network design tool, network designers may be able to reduce the data traffic relating to event processing between adjacent event relationship network subnets.

By using the illustrative embodiments, the network designers may be able to analyze the causal relationships of events and the relationship strengths of the various event relationship network subnets in their event relationship network design. Based on the analysis they may then be able to distribute event correlation processing capabilities and systems, such as rules engines, across the event relationship network such that event related data traffic is reduced in comparison to not using the illustrative embodiments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for distributing event processing, the computer implemented method comprising:
    performing an analysis of event information flowing from a first event relationship network subnet to a second event relationship network subnet in an event relationship network, wherein the event relationship network is a representation of relationships between events occurring in a data processing environment, wherein the first event relationship network subnet is one part of the event relationship network and processes a first event, wherein the second event relationship network subnet is one part of the event relationship network and processes a second event in the data processing environment;
    determining a strength of a relationship between the first and the second event relationship network subnets based on the analysis, wherein the determining the strength includes determining if an amount of the event information is one of above a preset threshold amount of the event information and above a preset percentage of a total event information; and
    recommending a distribution of the event processing in the event relationship network based on the strength of the relationship.

2. The computer implemented method of claim 1, wherein the event information includes one of a number of events, and a number of event related information, and wherein the event information includes information indicative of the first event causing the second event.

3. The computer implements method of claim 2, wherein the event information further includes a first number of events in the first event relationship network subnet causing a second number of events in the second event relationship network subnet.

4. The computer implemented method of claim 1, wherein the recommending the distribution further comprises recommending combining the event processing in a strong event relationship network subnet relationship.

5. The computer implemented method of claim 4, wherein combining the event processing includes processing of the events in a single rules engine.

6. The computer implemented method of claim 5, wherein the rules engine performs the processing of events in accordance with a set of correlation rules.

7. A computer usable program product comprising a computer usable storage device including computer usable code for distributing event processing, the computer usable code comprising:
    computer usable code for performing an analysis of event information flowing from a first event relationship network subnet to a second event relationship network subnet in an event relationship network, wherein the event relationship network is a representation of relationships between events occurring in a data processing environment, wherein the first event relationship network subnet is one part of the event relationship network and processes a first event, wherein the second event relationship network subnet is one part of the event relationship network and processes a second event in the data processing environment;
    computer usable code for determining a strength of a relationship between the first and the second event relationship network subnets based on the analysis, wherein the computer usable code for determining the strength includes computer usable code for determining if an amount of the event information is one of above a preset threshold amount of the event information and above a preset percentage of a total event information; and
    computer usable code for recommending a distribution of the event processing in the event relationship network based on the strength of the relationship.

8. The computer usable program product of claim 7, wherein the event information includes one of a number of events, and a number of event related information, and wherein the event information includes the first event causing the second event.

9. The computer usable program product of claim 8, wherein the event information further includes a first number of events in the first event relationship network subnet causing a second number of events in the second event relationship network subnet.

10. The computer usable program product of claim 7, wherein the computer usable code for recommending the distribution further comprises computer usable code for recommending combining the event processing in a strong event relationship network subnet relationship.

11. The computer usable program product of claim 10, wherein computer usable code for recommending combining the event processing includes computer usable code for recommending processing of the events in a single rules engine.

12. The computer usable program product of claim 11, wherein the rules engine performs the processing of events in accordance with a set of correlation rules.

13. A data processing system for distributing event processing, the data processing system comprising:
  a storage device, wherein the storage device stores computer usable program code; and
  a processor, wherein the processor executes the computer usable program code, and wherein the computer usable program code comprises:
  computer usable code for performing an analysis of event information flowing from a first event relationship network subnet to a second event relationship network subnet in an event relationship network, wherein the event relationship network is a representation of relationships between events occurring in a data processing environment, wherein the first event relationship network subnet is one part of the event relationship network and processes a first event, wherein the second event relationship network subnet is one part of the event relationship network and processes a second event in the data processing environment;
  computer usable code for determining a strength of a relationship between the first and the second event relationship network subnets based on the analysis, wherein the computer usable code for determining the strength includes computer usable code for determining if an amount of the event information is one of above a preset threshold amount of the event information and above a preset percentage of a total event information; and
  computer usable code for recommending a distribution of the event processing in the event relationship network based on the strength of the relationship.

14. The computer usable program product of claim 13, wherein the event information includes one of a number of events, and a number of event related information, and wherein the event information includes the first event causing the second event.

15. The computer usable program product of claim 14, wherein the event information further includes a first number of events in the first event relationship network subnet causing a second number of events in the second event relationship network subnet.

16. The computer usable program product of claim 13, wherein the computer usable code for recommending the distribution further comprises computer usable code for recommending combining the event processing in a strong event relationship network subnet relationship.

17. The computer usable program product of claim 16, wherein the rules engine performs the processing of events in accordance with a set of correlation rules.

* * * * *